US010072974B2

(12) United States Patent
Geurts

(10) Patent No.: US 10,072,974 B2
(45) Date of Patent: Sep. 11, 2018

(54) IMAGE SENSORS WITH LED FLICKER MITIGATON GLOBAL SHUTTER PIXLES

(71) Applicant: SEMICONDUCTOR COMPONENTS INDUSTRIES, LLC, Phoenix, AZ (US)

(72) Inventor: Tomas Geurts, Haasrode (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 232 days.

(21) Appl. No.: 15/174,708

(22) Filed: Jun. 6, 2016

(65) Prior Publication Data
US 2017/0350755 A1 Dec. 7, 2017

(51) Int. Cl.
*G01J 1/42* (2006.01)
*G01J 1/44* (2006.01)
*H04N 5/235* (2006.01)

(52) U.S. Cl.
CPC ............. *G01J 1/4228* (2013.01); *G01J 1/44* (2013.01); *H04N 5/235* (2013.01)

(58) Field of Classification Search
CPC .... G01J 1/4228; G01J 1/42; G01J 1/44; G01J 2001/446; G01J 2001/448; H04N 5/235; H04N 5/2357
See application file for complete search history.

(56) References Cited

U.S. PATENT DOCUMENTS

| | | | |
|---|---|---|---|
| 7,332,786 B2 | 2/2008 | Altice et al. | |
| 7,800,675 B2 | 9/2010 | Shah | |
| 7,884,402 B2 | 2/2011 | Ki | |
| 8,089,036 B2 | 1/2012 | Manabe | |
| 8,866,059 B2 * | 10/2014 | Murata | H01L 27/14603 250/208.1 |
| 8,928,792 B1 * | 1/2015 | Hynecek | H04N 5/3591 348/308 |
| 9,118,883 B2 | 8/2015 | Wan | |
| 9,686,488 B2 * | 6/2017 | Barna | H04N 5/2327 |
| 9,741,754 B2 * | 8/2017 | Li | H01L 27/14616 |
| 9,900,481 B2 * | 2/2018 | Geurts | H04N 5/2253 |
| 2004/0218078 A1 * | 11/2004 | Lee | H01L 27/14603 348/308 |
| 2005/0083421 A1 * | 4/2005 | Berezin | H04N 3/155 348/308 |

(Continued)

*Primary Examiner* — John Lee
(74) *Attorney, Agent, or Firm* — Treyz Law Group, P.C.; Joseph F. Guihan

(57) ABSTRACT

An image sensor may include one or more pixels having a charge steering structure that may selectively route charge from a photodiode to increase the dynamic range of the pixel. The charge steering structure may be a coupled gate structure that routes overflow charge to a voltage supply and to one or more integrating storage structures during an exposure period. The charge steering structure may be two integrating storage structures directly connected to the photodiode that each integrate charge generated by the photodiode in an alternating fashion during an exposure period. Storage structures and transistors within the charge steering structure may receive control signals, which may be asserted in a mutually exclusive manner. Pixels may also include a dual-gain structure, which may provide additional charge storage capacity.

20 Claims, 11 Drawing Sheets

(56) References Cited

U.S. PATENT DOCUMENTS

| | | | |
|---|---|---|---|
| 2005/0157194 A1* | 7/2005 | Altice, Jr. | H04N 5/35581 348/308 |
| 2006/0243887 A1* | 11/2006 | Boemler | H01L 27/14603 250/208.1 |
| 2007/0035649 A1 | 2/2007 | McKee | |
| 2008/0036888 A1* | 2/2008 | Sugawa | H04N 5/2355 348/294 |
| 2008/0224186 A1* | 9/2008 | Ellis-Monaghan | H01L 27/14609 257/292 |
| 2009/0045319 A1* | 2/2009 | Sugawa | H01L 27/14609 250/208.1 |
| 2009/0095986 A1* | 4/2009 | Neukom | H04N 3/155 257/225 |
| 2009/0108176 A1 | 4/2009 | Blanquart | |
| 2009/0141155 A1* | 6/2009 | Ellis-Monaghan | H04N 5/35527 348/308 |
| 2012/0256077 A1* | 10/2012 | Yen | H01L 27/14609 250/208.1 |
| 2014/0077071 A1* | 3/2014 | Altice | H04N 5/35527 250/214 P |
| 2015/0163392 A1* | 6/2015 | Malone | H04N 5/2357 348/228.1 |
| 2015/0189199 A1* | 7/2015 | Borremans | H04N 5/3559 348/250 |
| 2016/0112662 A1* | 4/2016 | Guillon | H04N 5/3698 348/294 |
| 2017/0094203 A1* | 3/2017 | Barna | H04N 5/2327 |
| 2017/0150017 A1* | 5/2017 | Geurts | H04N 5/2253 |
| 2017/0244921 A1* | 8/2017 | Velichko | H01L 27/14627 |
| 2017/0251151 A1* | 8/2017 | Hicks | H01L 27/14614 |
| 2017/0257580 A1* | 9/2017 | Barna | H04N 5/2327 |
| 2017/0264845 A1* | 9/2017 | Lee | H04N 5/378 |
| 2017/0324917 A1* | 11/2017 | Mlinar | H04N 5/3592 |
| 2017/0350755 A1* | 12/2017 | Geurts | G01J 1/4228 |
| 2017/0366764 A1* | 12/2017 | Innocent | H04N 5/353 |
| 2018/0070031 A1* | 3/2018 | Velichko | H01L 27/14636 |

* cited by examiner

IMAGE SENSORS WITH LED FLICKER MITIGATON GLOBAL SHUTTER PIXLES

BACKGROUND

This relates generally to imaging sensors, and more particularly, to imaging sensors with global shutter pixels that include LED flicker mitigation (LFM) structures.

In conventional imaging systems, image artifacts may be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars.

While electronic rolling shutter and global shutter modes produce images with different artifacts, the root cause for such artifacts is common for both modes of operation. Typically, image sensors acquire light asynchronously relative to the scenery being captured. This means that portions of an image frame may not be exposed for part of the frame duration. This is especially true for bright scenery when integration times are much shorter than the frame time used. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations.

Conventional imaging systems also may have images with artifacts associated with low dynamic range. Scenes with bright and dark portions may produce artifacts in conventional image sensors, as portions of the image may be over exposed or under exposed.

It would therefore be desirable to be able to provide high dynamic range (HDR) global shutter imaging systems for capturing images with minimized artifacts related to moving objects, moving or shaking camera, flickering lighting, and objects with changing illumination.

DETAILED DESCRIPTION

Figure 1:
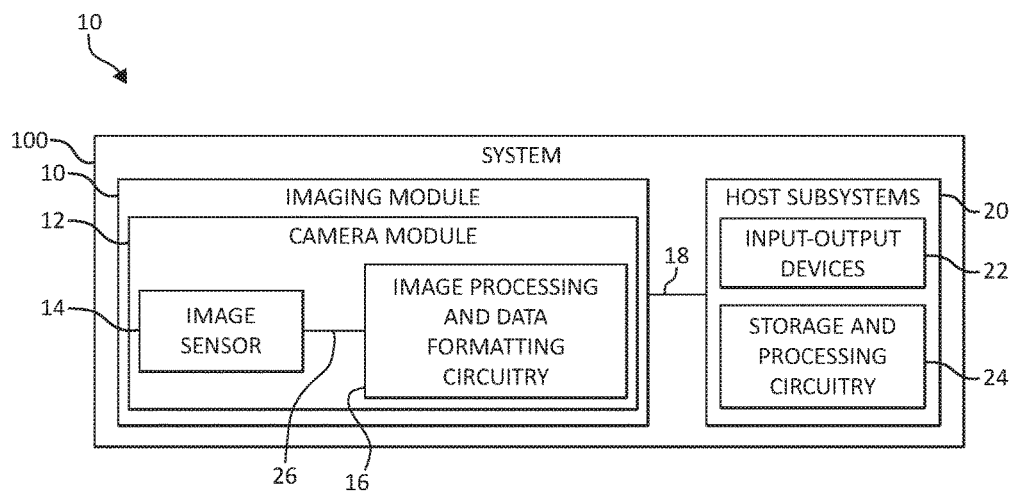
FIG. 1 is a diagram of an illustrative system that includes an imaging system and a host subsystem in accordance with an embodiment.

Embodiments of the present invention relate to image sensors, and more particularly, to global shutter image sensors having pixels that each contain coupled gate structures with LED flicker mitigation (LFM) timing for high dynamic range imaging. It will be recognized by one skilled in the art, that the present exemplary embodiments may be practiced without some or all of these specific details. In other instances, well-known operations have not been described in detail in order not to unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels).

In some conditions, such as high light conditions, more charge may accumulate in a photodiode of an image sensor pixel than can be stored within the pixel. For instance, storage nodes or photodiodes in a pixel may only be capable of storing a limited amount of charge. This limited charge storage capacity may reduce the dynamic range of the pixel, which is undesirable. In order to overcome this dynamic range limitation, it may be desirable to include a mechanism within a pixel for steering some charge to either extra storage nodes in the pixel or to a pixel voltage supply. This charge steering may be accomplished, for instance, by setting the voltage of one or more transistors coupled to the photodiode at an intermediate level during charge accumulation. By partially activating the transistor(s) in this way, excess charge (sometimes referred to herein as overflow charge) may be routed from the photodiode to one or more storage nodes or to the pixel voltage supply.

Overflow charges that are routed to the pixel voltage supply are disposed of. Such disposal of charges may be performed in a manner such that a reasonably accurate estimate of the amount of charge disposed of can be made, which may be accounted for by downstream processing circuitry. Overflow charges that are routed to the storage node(s) may be read out separately from non-overflow charges. The magnitude of the overflow charge signal that is read out may be a known fraction of the total overflow charge. Thus, a portion of the charge accumulated in the photodiode may be kept track of by the image sensor without the need for storing said charge, thereby increasing the dynamic range of the pixel.

In some configurations, overflow charges may not be routed to the pixel voltage supply and may instead be routed to multiple storage nodes. In such configurations, overflow charges may also be read out separately from non-overflow charges. By performing separate readout of overflow charges and non-overflow charges, the dynamic range of the pixel may be increased. The method of overflow and non-overflow charge read out operations is not described in detail in order not to unnecessarily obscure the present embodiments.

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc. During operation of imaging system 10, camera module 12 may continuously capture and provide image frames to host subsystem 20.

Figure 2:
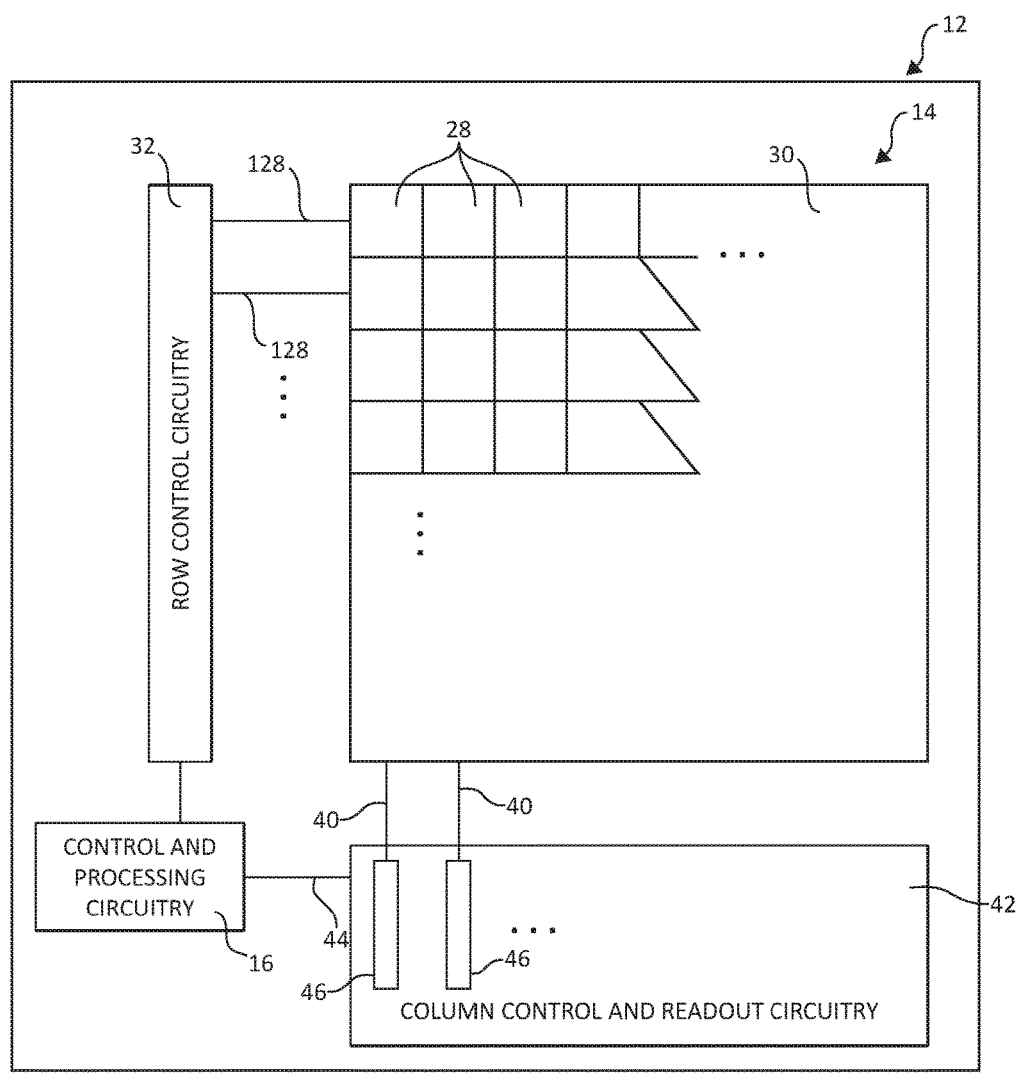
FIG. 2 is a diagram of an illustrative image sensor having an array of image pixels and control circuitry coupled to the array of image pixels in accordance with an embodiment.

An example of an arrangement for camera module 12 is shown in FIG. 2. As shown in FIG. 2, camera module 12 includes image sensor 14 and control and processing circuitry 16. Image sensor 14 may include a pixel array such as array 30 of pixels 28 (sometimes referred to herein as image sensor pixels or image pixels 28). Control circuitry 16 may be coupled to row control circuitry 32 and may be coupled to column control and readout circuitry 42 via global data path 44. Row control circuitry 32 may receive row addresses from control circuitry 16 and may supply corresponding row control signals to image pixels 28 over control paths 128 (e.g., dual conversion gain control signals, pixel reset control signals, charge transfer control signals, blooming control signals, row select control signals, or any other desired pixel control signals). Column control and readout circuitry 42 may be coupled to the columns of pixel array 30 via one or more conductive lines such as column lines 40. Column lines 40 may be coupled to each column of image pixels 28 in image pixel array 30 (e.g., each column of pixels may be coupled to a corresponding column line 40). Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out by circuitry 42 on column lines 40.

Column control and readout circuitry 42 may include a number of column readout circuits 46. Each column readout circuit 46 may be coupled to a corresponding column line 40 and may read out and receive image signals from pixels 28 coupled to the corresponding column line. Each column readout circuit 46 may include column circuitry such as a column amplifier for amplifying signals read out from array 20, sample and hold circuitry for sampling and storing signals read out from array 20, analog-to-digital converter (ADC) circuit for converting read out analog signals to corresponding digital signals, and column memory for storing the read out signals and any other desired data. Column readout circuits 46 may output digital pixel values to control and processing circuitry 16 over line 44.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

If desired, array 30 may be part of a stacked-die arrangement in which pixels 28 of array 30 are split between two or more stacked substrates. In such an arrangement, each of the pixels 28 in the array 30 may be split between the two dies at any desired node within pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

Figure 3:
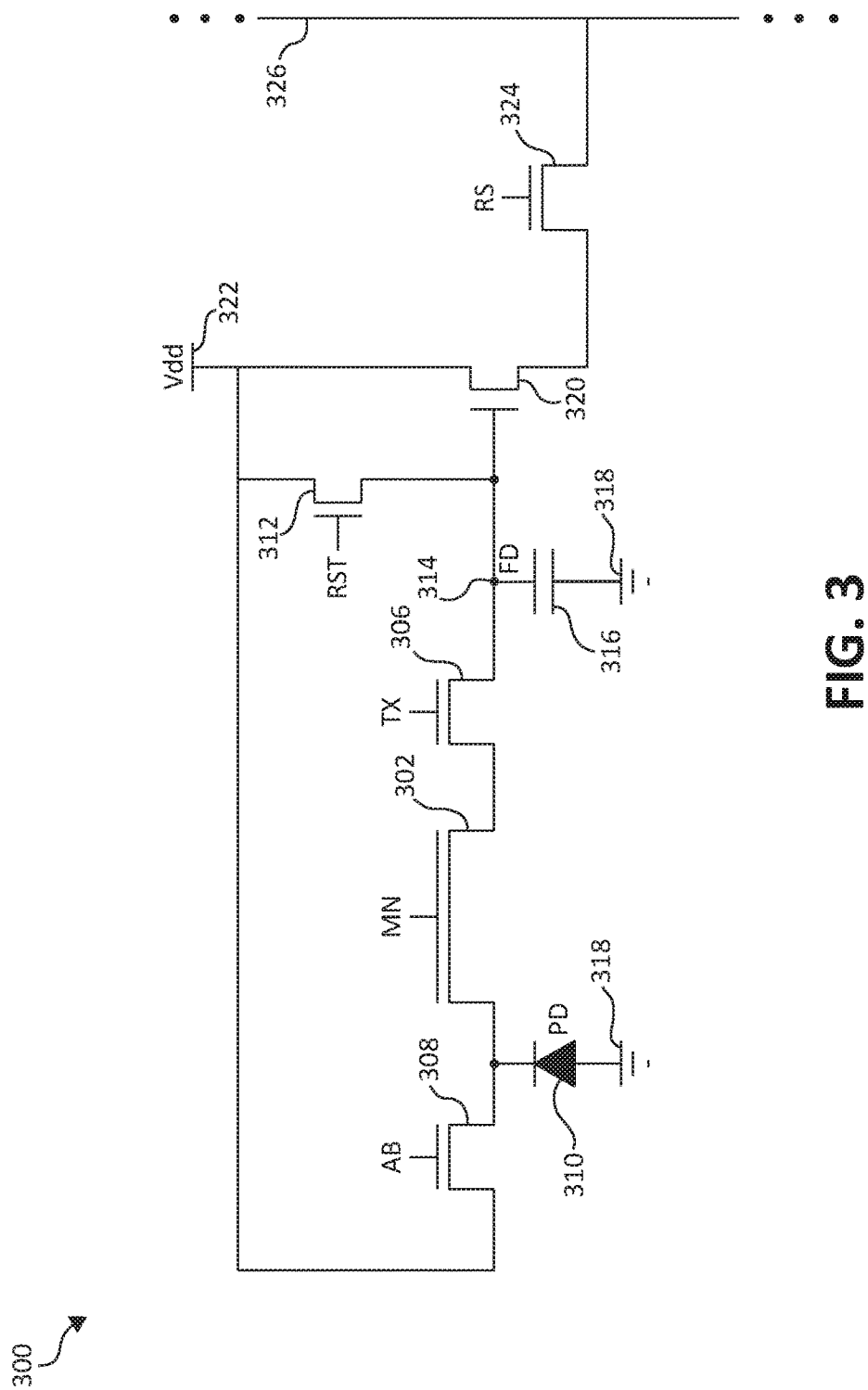
FIG. 3 is a circuit diagram of an image sensor pixel that uses a global shutter method of readout in accordance with an embodiment.

FIG. 3 is a circuit diagram of an image sensor pixel 300 that uses a global shutter method of readout. Image sensor pixel 300 represents a global shutter pixel with pinned photodiode 310 (PD) coupled to memory node 302 (sometimes referred herein to as a storage node or a storage gate). In some embodiments, memory node 302 may be a storage gate or a storage diode. For embodiments in which memory node 302 is a storage gate, an additional transistor may be optionally interposed between memory node 302 and photodiode 310. For embodiments in which memory node 302 is a storage diode, an additional transistor may be interposed between memory node 302 and photodiode 310. Anti-blooming transistor 308 is partially activated using control signal AB in order to draw away dark current that accumulates on photodiode 310. If desired, anti-blooming transistor 308 may be fully activated using control signal AB in order to reset the photodiode. Impinging light (i.e., incident light) may generate charge in photodiode 302 in a sensor array (e.g., array 20 in FIG. 2). This charge may be transferred to memory node 302 globally for all of the pixels at the same time by asserting control signal TX1. The readout of charge from the memory node 302 then proceeds in a sequential manner, row by row, by transferring charge via charge transferring transistor 306 to floating diffusion (FD) node 314 by asserting control signal TX2. Floating diffusion node 314 may have a floating diffusion capacitance 316 for storing charge. Photodiode 310 and floating diffusion capacitance 316 may be coupled to ground 318. Charge transferred to floating diffusion node 314 causes the potential on this node to change and this change is sensed by the source follower transistor 320. A source-drain terminal of source follower transistor 320 is connected via row select transistor 324 to the sensor array column sensing line 326 that deliver the pixel signal to the periphery of the array for further processing. Control signal RS is asserted to activate row select transistor 324 to transfer the pixel signal to column sensing lines 326. After charge sensing has been completed, floating diffusion node 314 is reset by momentarily turning on reset transistor 312 by asserting control signal RES to transfer supply voltage $V_{AA}$ from supply 322 to floating diffusion node 314. If desired, the memory node 302 can be reset at the same time as floating diffusion node 314 is reset.

The dynamic range of pixel 300 is limited by the charge storage capacity of photodiode 310 and storage gate 302.

This limitation in pixel dynamic range is undesirable as it may result in the loss of image details in high light conditions. It would therefore be desirable to provide improved image pixels that have larger effective charge storage capacities.

Figure 4A:
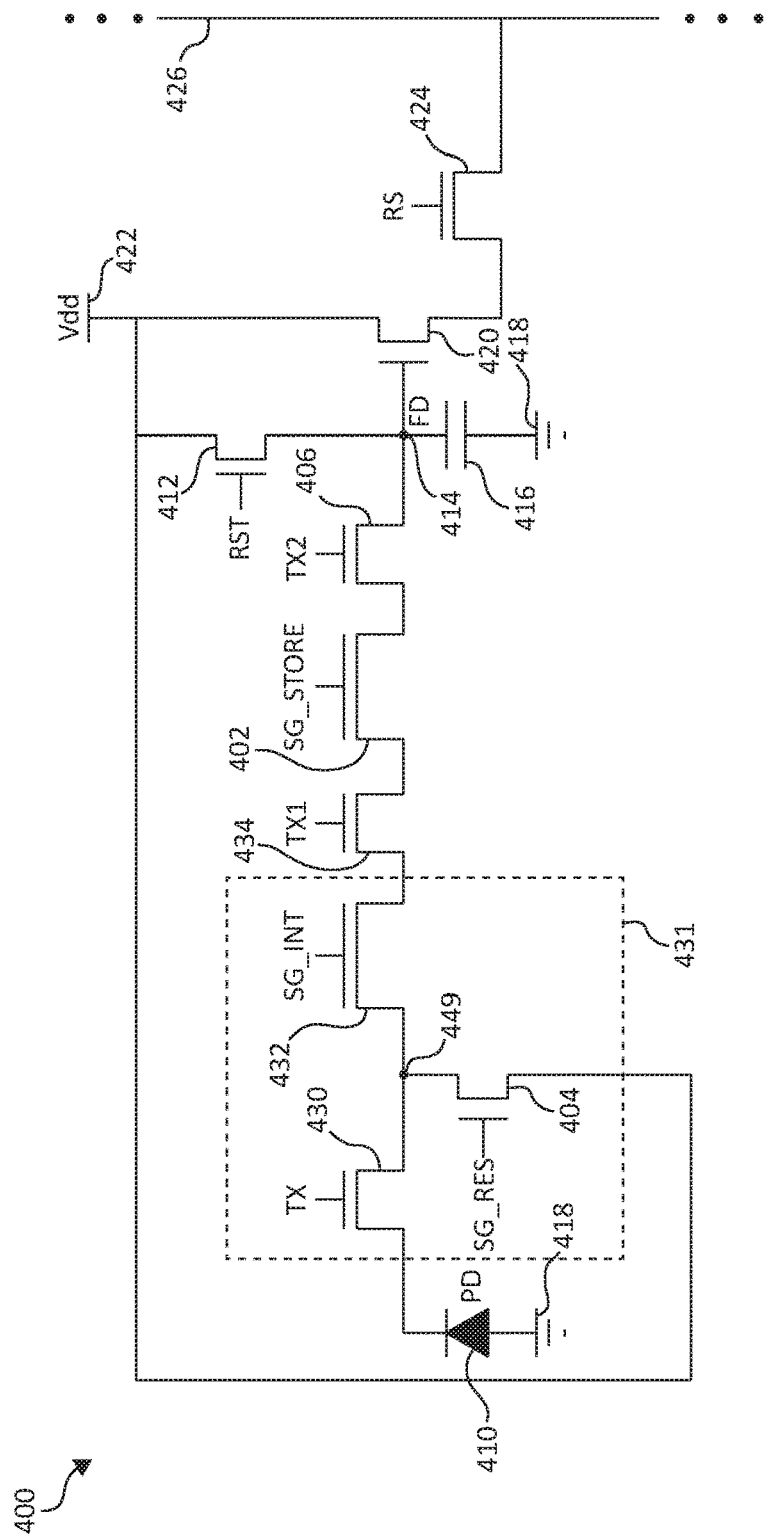
FIG. 4A is a circuit diagram of an illustrative image sensor pixel that uses a global shutter method of readout and that includes a charge steering structure in accordance with an embodiment.

FIG. 4A is a diagram of a pixel circuit 400 that includes a charge-steering coupled gate structure. Coupled gate structure 431 may include storage gate reset transistor 404, threshold transistor 430, and storage structure 432 (sometimes referred to herein as an integrating storage gate or as a storage gate). In some embodiments, storage structure 432 may be a storage gate or a storage diode. For embodiments in which storage structure 432 is a storage gate, an additional transistor may be optionally interposed between storage structure 432 and transfer transistor 430. For embodiments in which storage structure 432 is a storage diode, an additional transistor may be interposed between storage gate structure 432 and transfer transistor 430. Threshold transistor 430 may be coupled to photodiode (PD) 410. Storage gate 432 may be, for example, a pinned storage gate that is fully depletable (e.g., all charge may be removed from storage gate 432 during charge transfer). The coupled gate structure may work like a charge coupled device structure. Photodiode 410 may be coupled to ground 418. Threshold transistor 430 may be coupled between photodiode 410 and storage gate 432. Storage gate reset transistor 404 may have a first source-drain terminal coupled to a node between threshold transistor 430 and storage gate 432 and may have a second source-drain terminal coupled to voltage supply 422. Transfer transistor 434 may be coupled between storage gate 432 and storage structure 402 (sometimes referred to herein as a storage gate). In some embodiments, storage structure 402 may be a storage gate or a storage diode. Storage gate 402 may be coupled between transfer transistor 434 and transfer transistor 406. Transfer transistor 406 may be coupled between storage gate 402 and floating diffusion node (FD) 414. Floating diffusion capacitance 416 may be coupled between floating diffusion node 414 and ground 418. Reset transistor 412 may be coupled between floating diffusion node 414 and voltage supply 422. Voltage supply 422 may supply voltage $V_{dd}$. Source follower transistor 420 may have a gate terminal coupled to floating diffusion node 414, a first source-drain terminal coupled to voltage supply 422, and a second source-drain terminal coupled to column output line 426 through row select transistor 424. Column output line 426 may be coupled to downstream processing circuitry such as analog-to-digital conversion circuitry.

If desired, an anti-blooming transistor (not shown) may be optionally included that is coupled between supply voltage 422 and photodiode 410.

During an exposure period, impinging light (i.e., incident light) may be converted to electric charge in photodiode 410, which may have a limited charge storage capacity. In high light conditions, the charge storage capacity of photodiode 410 may not be sufficient to store all of the charge being generated in photodiode 410 and a portion of the generated charge may overflow. Threshold transistor 430 may receive a control signal TX that is set at a threshold voltage, which allows the overflow charge to pass to node 449 while the non-overflow charge remains on photodiode 410.

Storage gate 432 may receive control signal SG_INT and storage gate reset transistor 404 may receive control signal SG_RES. Storage gate 432 may prevent charge from flowing when SG_INT is at a medium voltage level $V_M$. Charge may be loaded onto storage gate 432 when SG_INT is at a high voltage level $V_H$. Loaded charge may be passed to storage gate 402 from storage gate 432 when SG_INT is at a low voltage level $V_L$ and transfer transistor 434 is simultaneously at a high voltage level. Storage gate 402 may receive control signal SG_STORE and may operate similarly to storage gate 432. It should be noted that in some embodiments, instead of using the high voltage level $V_H$, a medium-high voltage level may be used having a magnitude between that of $V_H$ and $V_M$, such that some charge remains on the photodiode when charge is loaded onto storage gate 432.

During the exposure period, signals SG_INT and SG_RES may have mutually exclusive timings (e.g., SG_INT is at voltage $V_H$ when SG_RES is low, SG_INT is at voltage $V_M$ when SG_RES is high, and SG_INT oscillates between $V_H$ and $V_M$). By oscillating signals SG_INT and SG_RES in this manner, overflow charge appearing on node 449 may be routed to voltage supply 422 when SG_RES is at a high voltage level and may be integrated at storage gate 432 when SG_INT is at high voltage level $V_H$. The amount of overflow charge that is disposed of at voltage supply 422 during exposure may be determined and accounted for using downstream processing circuitry (not shown) based on the amount of overflow charge that is not disposed of (i.e., that ends up being read out from pixel 400) and based on the respective duty cycles of signals SG_INT and SG_RES. At the end of the exposure period, floating diffusion node 414 may be reset by asserting signal RST to activate reset transistor 412.

Once the exposure period ends, all charge integrated in storage gate 432 may be transferred to storage gate 402 by setting SG_INT to low voltage level $V_L$, setting control signal TX1 to a high voltage level to activate transfer transistor 434, and setting control signal SG_STORE to high voltage level $V_H$ so that storage gate 402 can receive the transferred charge. Storage gate 402 may then pass the overflow charge to floating diffusion node 414 by asserting signal TX2 to activate transfer transistor 406 while signals SG_STORE and TX1 are held low in order to ensure that the charge flows into floating diffusion node 414. Non-overflow charge at photodiode 410 may then be passed to storage gate 402 through threshold transistor 430, storage gate 432, and transfer transistor 434. It should be noted that some of the operations described above will be somewhat different for embodiments in which storage structures 402 and 432 are storage diodes.

During readout operations, row select transistor 424 may be activated by asserting signal RS in order to read out an output signal that corresponds to the overflow charge stored at floating diffusion node 414. Floating diffusion node 414 may then be reset using reset transistor 412. The reset value stored at floating diffusion node 414 may then be read out by activating row select transistor 424. Non-overflow charge stored at storage gate 402 may then be transferred to floating diffusion node 414 by activating transfer transistor 406. Row select transistor 424 may then be activated to read out another output signal that corresponds to the non-overflow charge stored at floating diffusion node 414. Floating diffusion node 414 may then be reset again in preparation for the next exposure/integration period.

Figure 4B:
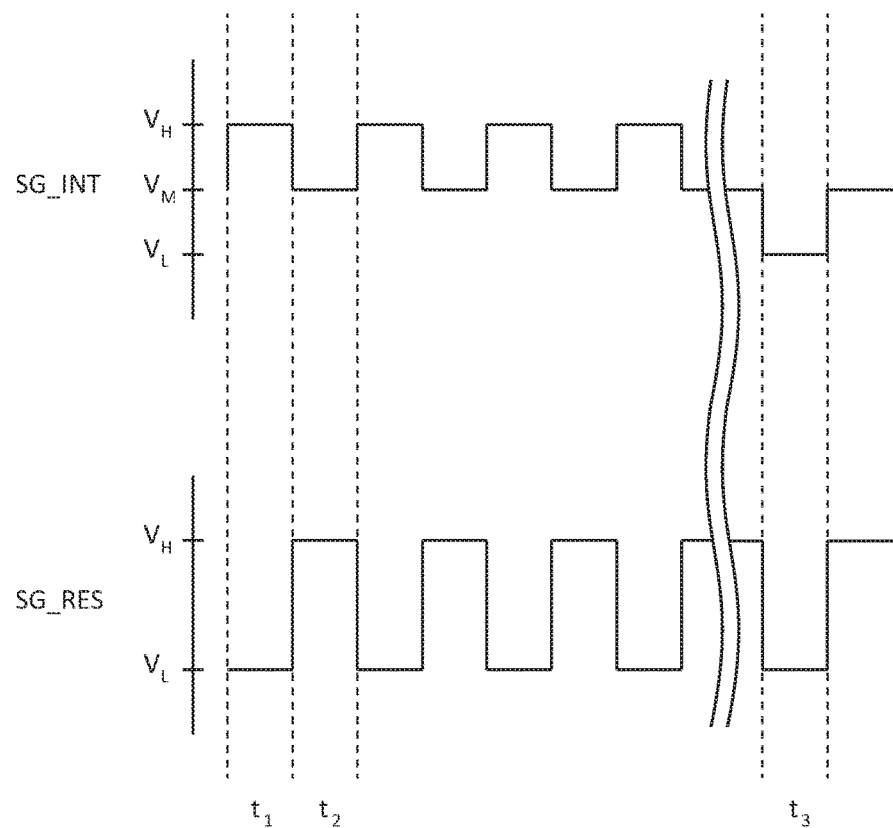
FIG. 4B is an illustrative timing diagram showing the timing of control signals for the charge steering structure of FIG. 4A in accordance with an embodiment.

Signals SG_INT and SG_RES may behave according to the timing diagram shown in FIG. 4B. Time periods $t_1$ and $t_2$ may represent a single clock cycle of signals SG_INT and SG_RES during the exposure period. At time period $t_1$, SG_INT may be at high voltage level $V_H$, while SG_RES is at low voltage level $V_L$ such that overflow charge at node 449 is integrated at storage gate 432. At time period $t_2$, SG_INT may be at medium voltage level $V_M$, while SG_RES is at high voltage level $V_H$ such that overflow charge is disposed of at voltage supply 422. The clock cycle represented by time periods $t_1$ and $t_2$ may repeat throughout the exposure period. As shown in FIG. 4B, signals SG_INT and SG_RES may each have a 50% duty cycle. If desired, other duty cycles may be selected. For example, signal SG_INT may have a 25% duty cycle and signal SG_RES may have a 75% duty cycle if an increased dynamic range is desired. In some embodiments, there may be periods of time during the exposure period in which signal SG_INT is held at $V_M$ and SG_RES is held at $V_L$.

Time period $t_3$ may occur at the end of the exposure period. At $t_3$, signals SG_RES and SG_INT are held at $V_L$ while signals SG_STORE and TX1 are held at $V_H$ such that storage gate reset transistor 404 is turned off and charge that has been integrated at storage gate 432 is passed through transfer transistor 434 and stored at storage gate 402.

Figure 5A:
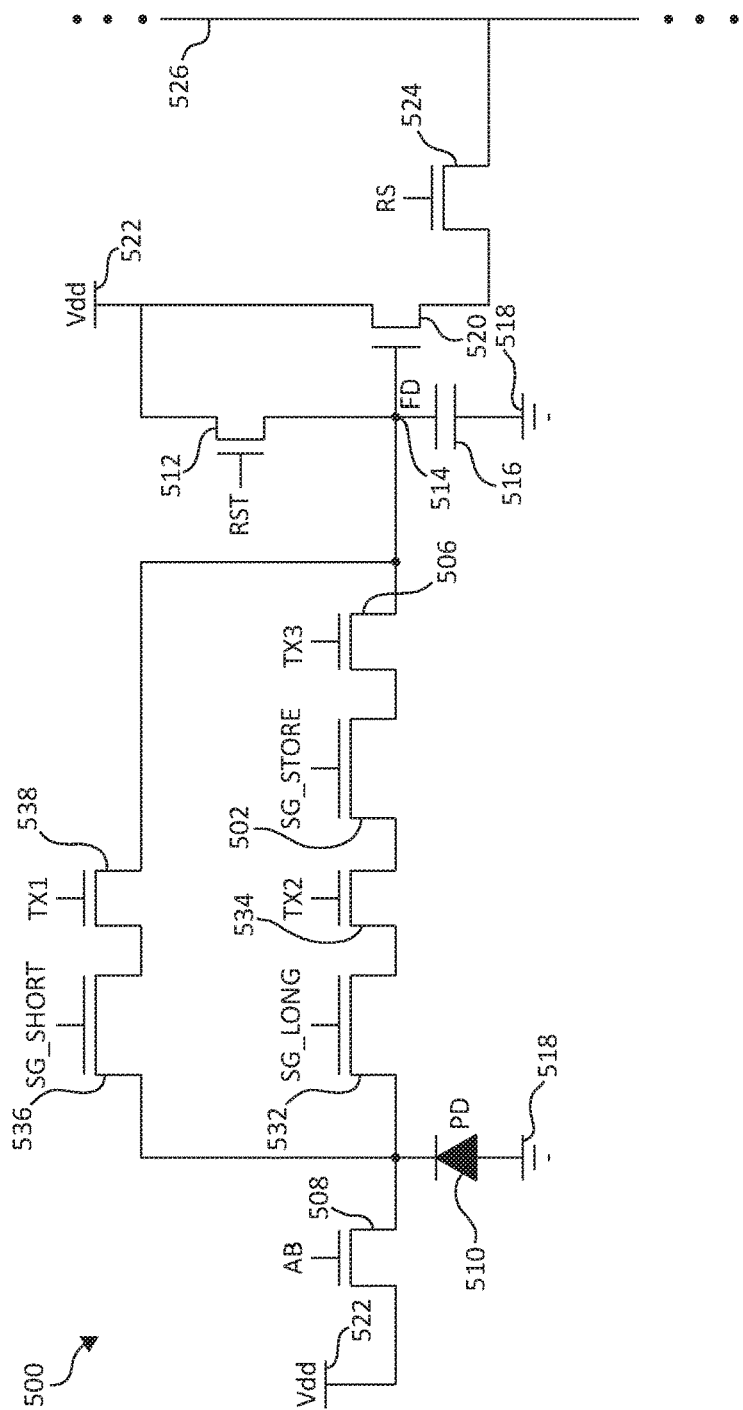
FIG. 5A is a circuit diagram of an illustrative image sensor pixel that uses a global shutter method of readout and that includes a charge steering structure that includes a long integration path and a short integration path.

FIG. 5A is a diagram of a pixel circuit 500 that includes a charge-steering structure. Long integration storage structure 532 (sometimes referred to herein as an integrating storage gate or as a storage gate) and short integration storage structure 536 (sometimes referred to herein as an integrating storage gate or as a storage gate) may act as a charge steering structure.

In some embodiments, long integration storage structure 532 may be a storage gate or a storage diode. For embodiments in long integration storage structure 532 is a storage gate, an additional transistor may be optionally interposed between long integration storage structure 532 and photodiode 510. For embodiments in which long integration storage structure 532 is a storage diode, an additional transistor may be interposed between long integration storage structure 532 and photodiode 510.

In some embodiments, short integration storage structure 536 may be a storage gate or a storage diode. For embodiments in short integration storage structure 536 is a storage gate, an additional transistor may be optionally interposed between short integration storage structure 536 and photodiode 510. For embodiments in which short integration storage structure 536 is a storage diode, an additional transistor may be interposed between short integration storage structure 536 and photodiode 510.

Storage gates 532 and 536 may be, for example, pinned storage gates that are fully depletable (e.g., all charge may be removed from storage gates 532 and 536 during charge transfer). Photodiode (PD) 510 may have a first terminal coupled to ground 518 and a second terminal coupled to anti-blooming transistor 508, short integration storage gate 536, and long integration storage gate 532. Anti-blooming transistor 508 may be coupled between photodiode 510 and voltage supply 522. Voltage supply 522 may supply voltage $V_{dd}$. Anti-blooming transistor 508 may be partially activated using control signal AB in order to draw away dark current that accumulates on photodiode 510. If desired, anti-blooming transistor 508 may be fully activated using control signal AB in order to reset the photodiode. Short integration storage gate 536 may be coupled between photodiode 510 and transfer transistor 538. Transfer transistor 538 may be coupled to floating diffusion node (FD) 514. Long integration storage gate 532 may be coupled between photodiode 510 and transfer transistor 534. Storage structure 502 (sometimes referred to herein as a storage gate) may be coupled between transfer transistor 534 and transfer transistor 506. In some embodiments, storage structure 502 may be a storage gate or a storage diode. Transfer transistor 506 may be coupled between storage gate 502 and floating diffusion node 514. Floating diffusion capacitance 516 may be coupled between floating diffusion node 514 and ground 518. Reset transistor 512 may be coupled between floating diffusion node 514 and voltage supply 522. Source follower transistor 520 may have a gate terminal coupled to floating diffusion node 514, a first source-drain terminal coupled to voltage supply 522, and a second source-drain terminal coupled to column output line 526 through row select transistor 524. Column output line 526 may be coupled to downstream processing circuitry such as analog-to-digital conversion circuitry.

During an exposure period, impinging light (i.e., incident light) may be converted to electric charge in photodiode 510, which may have a limited charge storage capacity. Long integration storage gate 532 and short integration storage gate 536 may receive control signals SG_LONG and SG_SHORT respectively. Storage gates 502, 532, 536 may operate similarly to storage gate 432 described above in connection with FIG. 4A. Control signals SG_LONG and SG_SHORT may have mutually exclusive signal timings (e.g., when SG_LONG is at high voltage level $V_H$, SG_SHORT is at medium voltage level $V_M$, and when SG_SHORT is at high voltage level $V_H$, SG_LONG is at medium voltage level $V_M$). This mutually exclusive timing allows charge generated at photodiode 510 to be integrated and stored at either short integration storage gate 536 (e.g., stored as short integration overflow charge) or long integration storage gate 532 (e.g., stored as long integration overflow charge) during the exposure period. At the end of the exposure period, floating diffusion node 514 may be reset by asserting signal RST to activate reset transistor 512.

Once the exposure period ends, all charge integrated in long integration storage gate 532 may be transferred to storage gate 502 by setting SG_LONG to low voltage level $V_L$, setting control signal TX2 to a high voltage level to activate transfer transistor 534, and setting control signal SG_STORE to high voltage level $V_H$ so that storage gate 502 can receive the transferred charge. Storage gate 502 may then pass the long integration overflow charge to floating diffusion node 514 by asserting signal TX3 to activate transfer transistor 506 while signals SG_STORE and TX2 are held low in order to ensure that the charge flows into floating diffusion node 514.

During readout operations, row select transistor 524 may be activated by asserting signal RS in order to read out an output signal that corresponds to the long integration overflow charge stored at floating diffusion node 514. Floating diffusion node 514 may then be reset using reset transistor 512. The reset value stored at floating diffusion node 514 may then be read out by activating row select transistor 524. Short integration overflow charge stored at storage gate 536 may then be transferred to floating diffusion node 514. Row select transistor 524 may then be activated to read out another output signal that corresponds to the short integration overflow charge stored at floating diffusion node 514. Floating diffusion node 514 may then be reset again in preparation for the next exposure/integration period.

Figure 5B:
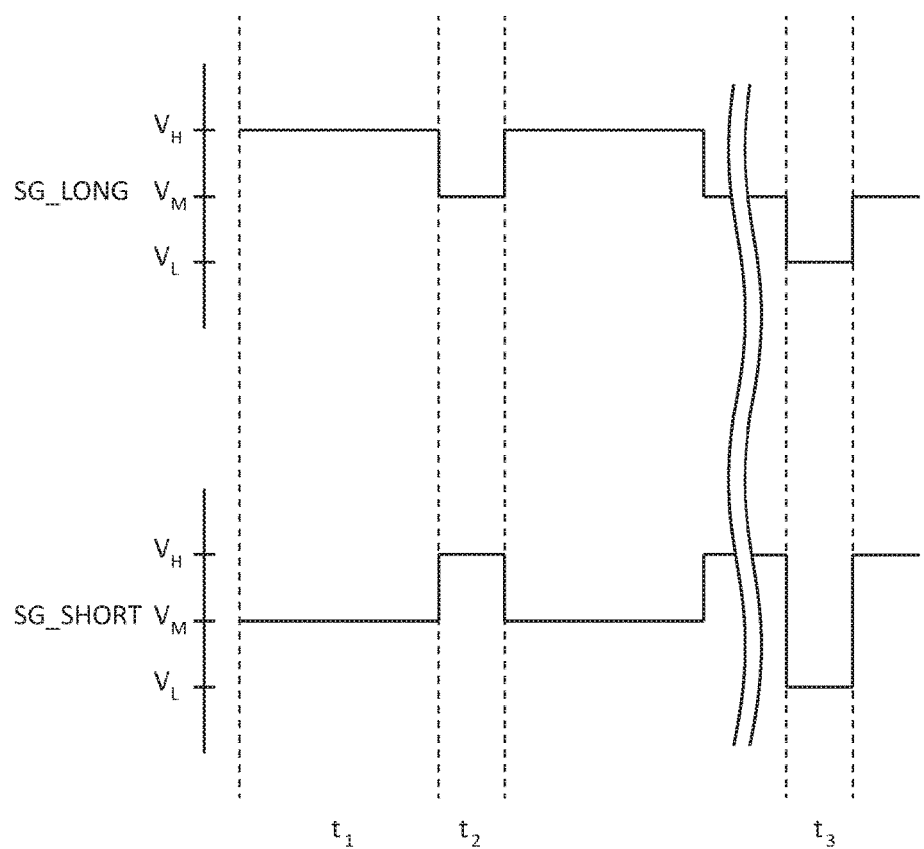
FIG. 5B is an illustrative timing diagram showing the timing of control signals for the charge steering structure of FIG. 5A in accordance with an embodiment.

Signals SG_LONG and SG_SHORT may behave according to the timing diagram shown in FIG. 5B. Time periods $t_1$ and $t_2$ may represent a single clock cycle of signals SG_LONG and SG_SHORT during the exposure period. At time period $t_1$, SG_LONG may be at high voltage level $V_H$, while SG_SHORT is at medium voltage level $V_M$ such that charge at photodiode 510 is integrated at long integration storage gate 532. At time period $t_2$, SG_LONG may be at medium voltage level $V_M$, while SG_SHORT is at high voltage level $V_H$ such that charge at photodiode 510 is integrated at short integration storage gate 536. The clock cycle represented by time periods $t_1$ and $t_2$ may repeat throughout the exposure period. As shown in FIG. 5B, signal SG_LONG may have a larger duty cycle than the duty cycle of SG_SHORT such that a majority of the charge generated during the exposure period is integrated at long integration storage gate 532. If desired, other duty cycles may be selected. In some embodiments, there may be periods of time during the exposure period in which signal SG_LONG is held at $V_M$ and SG_SHORT is held at $V_M$. It should be noted that in some embodiments, instead of using the high voltage level $V_H$, a medium-high voltage level may be used having a magnitude between that of $V_H$ and $V_M$, such that some charge remains on the photodiode when charge is loaded onto long integration storage gate 532 or short integration storage gate 536.

Time period $t_3$ may occur at the end of the exposure period. At $t_3$, signals SG_LONG and SG_SHORT are held at $V_L$ while signals SG_STORE, TX1, and TX2 are held at $V_H$ such that charge that has been integrated at long integration storage gate 532 is passed through transfer transistor 534 and stored at storage gate 502, and charge that has been integrated at short integration storage gate 536 is passed through transfer transistor 538 and stored at floating diffusion node 514.

Figure 6A:
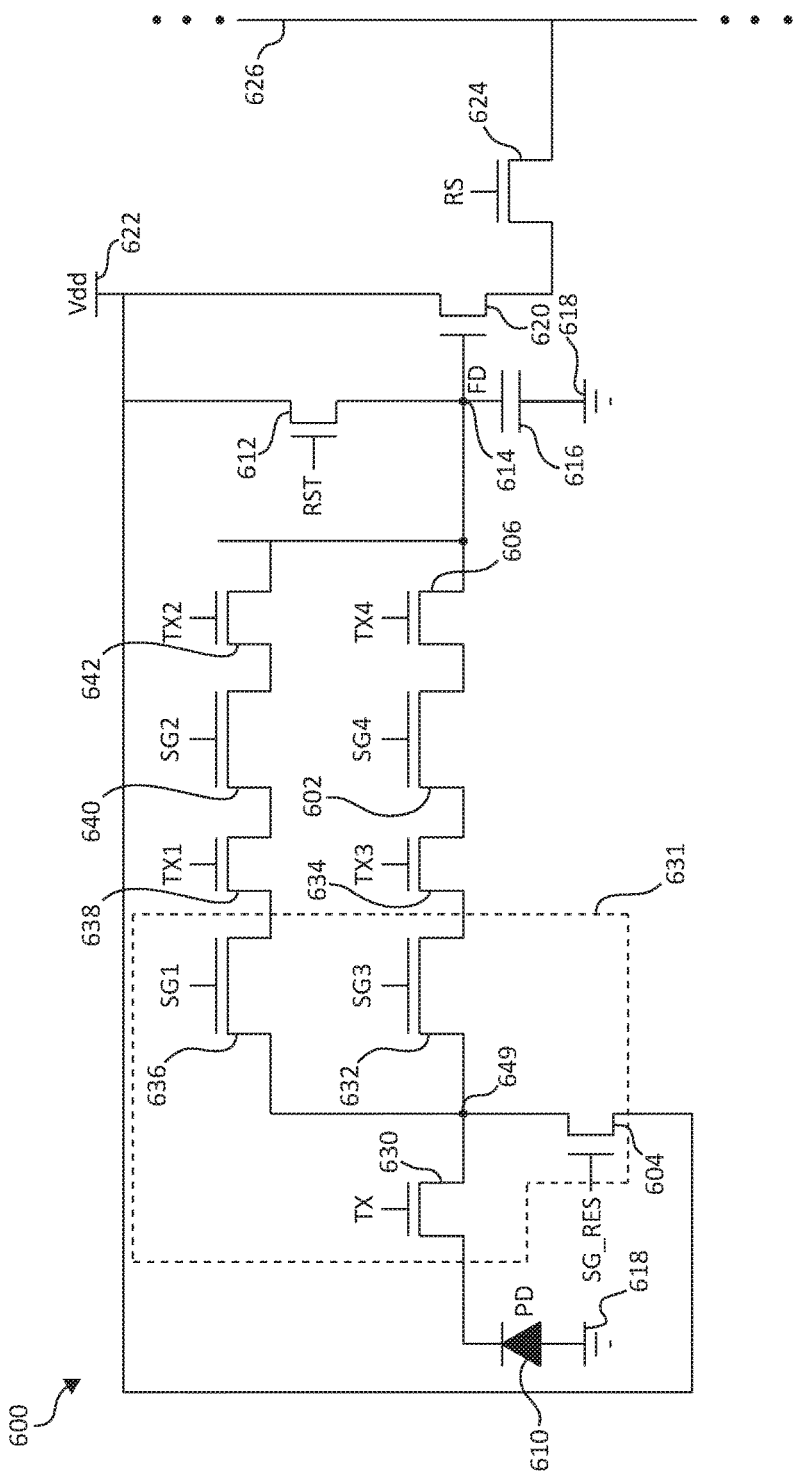
FIG. 6A is a circuit diagram of an illustrative image sensor pixel that uses a global shutter method of readout, that includes a charge steering structure, and that requires at least two pixel exposures in accordance with an embodiment.

FIG. 6A is a diagram of a pixel circuit 600 that includes a coupled gate charge-steering structure. Coupled gate structure 631 may include threshold transistor 630, storage gate reset transistor 604, storage structure 632 (sometimes referred to herein as an integrating storage gate or as a storage gate) and storage structure 636 (sometimes referred to herein as an integrating storage gate or as a storage gate).

In some embodiments, storage structure 632 may be a storage gate or a storage diode. For embodiments in storage structure 632 is a storage gate, an additional transistor may be optionally interposed between storage structure 632 and threshold transistor 630. For embodiments in which storage structure 632 is a storage diode, an additional transistor may be interposed between storage structure 632 and threshold transistor 630.

In some embodiments, storage structure 636 may be a storage gate or a storage diode. For embodiments in storage structure 636 is a storage gate, an additional transistor may be optionally interposed between storage structure 636 and threshold transistor 630. For embodiments in which storage structure 636 is a storage diode, an additional transistor may be interposed between storage structure 636 and threshold transistor 630.

Storage gates 632 and 636 may be, for example, pinned storage gates that are fully depletable (e.g., all charge may be removed from storage gates 632 and 636 during charge transfer). Photodiode (PD) 610 may have a first terminal coupled to ground 618 and a second terminal coupled to node 649 through threshold transistor 630. Storage gate reset transistor 604 may be coupled between node 649 and voltage supply 622. Voltage supply 622 may supply voltage $V_{dd}$. Transfer transistor 638 may be coupled between storage gate 636 and storage structure 640 (sometimes referred to herein as a storage gate). In some embodiments, storage structure 640 may be a storage gate or a storage diode. Transfer transistor 642 may be coupled between storage gate 640 and floating diffusion node (FD) 614. Transfer transistor 634 may be coupled between storage gate 632 and storage gate 602 (sometimes referred to herein as a storage gate). In some embodiments, storage structure 602 may be a storage gate or a storage diode. Transfer transistor 606 may be coupled between storage gate 606 and floating diffusion node 614. Floating diffusion capacitance 616 may be coupled between floating diffusion node 614 and ground 618. Reset transistor 612 may be coupled between floating diffusion node 614 and voltage supply 622. Source follower transistor 620 may have a gate terminal coupled to floating diffusion node 614, a first source-drain terminal coupled to voltage supply 622, and a second source-drain terminal coupled to column output line 626 through row select transistor 624. Column output line 626 may be coupled to downstream processing circuitry such as analog-to-digital conversion circuitry.

During an exposure period, impinging light (i.e., incident light) may be converted to electric charge in photodiode 610, which may have a limited charge storage capacity. In high light conditions, the charge storage capacity of photodiode 610 may not be sufficient to store all of the charge being generated in photodiode 610 and a portion of the generated charge may overflow. Threshold transistor 630 may receive a control signal TX that is set at a threshold voltage, which allows the overflow charge to pass to node 649 while the non-overflow charge remains on photodiode 610.

Storage gate 636 may receive control signal SG1. Storage gate 640 may receive control signal SG2. Storage gate 632 may receive control signal SG3. Storage gate 602 may receive control signal SG4. Storage gate reset transistor 604 may receive control signal SG_RES. Storage gates 602, 632, 636, and 640 may operate similarly to storage gate 432 described above in connection with FIG. 4A. Control signals SG1, SG3, and SG_RES may have mutually exclusive timings (e.g., when SG1 is at high voltage level $V_H$ then SG3 is at medium voltage level $V_M$ and SG_RES is at low voltage level $V_L$, when SG3 is at high voltage level $V_H$ then SG1 is at medium voltage level $V_M$ and SG_RES is at low voltage level $V_L$, and when SG_RES is at high voltage level $V_H$ then SG3 is at medium voltage level $V_M$ and SG1 is at medium voltage level $V_M$). Specifically, the activation of storage gate reset transistor 608 and the respective loading and integration of charge onto storage gates 632 and 636 may each be mutually exclusive events. This mutually exclusive timing allows charge generated at photodiode 610 to be integrated and stored at either storage gate 632 (e.g., stored as a first portion of the overflow charge), integrated and stored at storage gate 636 (e.g., stored as a second portion of the overflow charge), or disposed of at voltage supply 622 through storage gate reset transistor 608 during the exposure period. The amount of overflow charge that is disposed of at voltage supply 622 during exposure may be estimated and accounted for using downstream processing circuitry (not shown) based on the amount of overflow charge that is not disposed of (i.e., that ends up being read out from pixel 600) and based on the respective duty cycles of signals SG1, SG3, and SG_RES. At the end of the exposure period, floating diffusion node 614 may be reset by asserting signal RST to activate reset transistor 612.

Once the exposure period ends, all charge integrated in storage gate 632 may be transferred to storage gate 602 by setting SG3 to low voltage level $V_L$, setting control signal TX3 to a high voltage level to activate transfer transistor 634, and setting control signal SG4 to high voltage level $V_H$ so that storage gate 602 can receive the transferred charge. Additionally, at the end of the exposure period all charge integrated in storage gate 636 may be transferred to storage gate 640 by setting SG1 to low voltage level $V_L$, setting control signal TX1 to a high voltage level to activate transfer transistor 638, and setting control signal SG2 to high voltage level $V_H$ so that storage gate 640 can receive the transferred charge. Storage gate 602 may then pass the first portion of the overflow charge to floating diffusion node 614 by asserting signal TX4 to activate transfer transistor 606 while signals SG2 and TX1 are held low to ensure that the charge flows into floating diffusion node 614. Non-overflow charge at photodiode 610 may then be passed to storage gate 602 through threshold transistor 630, storage gate 632, and transfer transistor 634.

During readout operations, row select transistor 624 may be activated by asserting signal RS in order to read out an output signal that corresponds to the first portion of the overflow charge stored at floating diffusion node 614. If desired, row select transistor 624 may remain activated throughout the entire read-out sequence. Floating diffusion node 614 may then be reset using reset transistor 612. The reset value stored at floating diffusion node 614 may then be read out by activating row select transistor 624. The second portion of the overflow charge stored at storage gate 640 may then be transferred to floating diffusion node 614. Row select transistor 624 may then be activated to read out another output signal that corresponds to the second portion of the overflow charge stored at floating diffusion node 614. Floating diffusion node 614 may then be reset again using reset transistor 612. A second reset value may then be read from floating diffusion node 614 by activating row select transistor 624. Non-overflow charge stored at storage gate 602 may then be transferred to floating diffusion node 614 by activating transfer transistor 606. Row select transistor 624 may then be activated to read out yet another output signal that corresponds to the non-overflow charge stored at floating diffusion node 614. Floating diffusion node 614 may then be reset again in preparation for the next exposure/integration period.

Figure 6B:
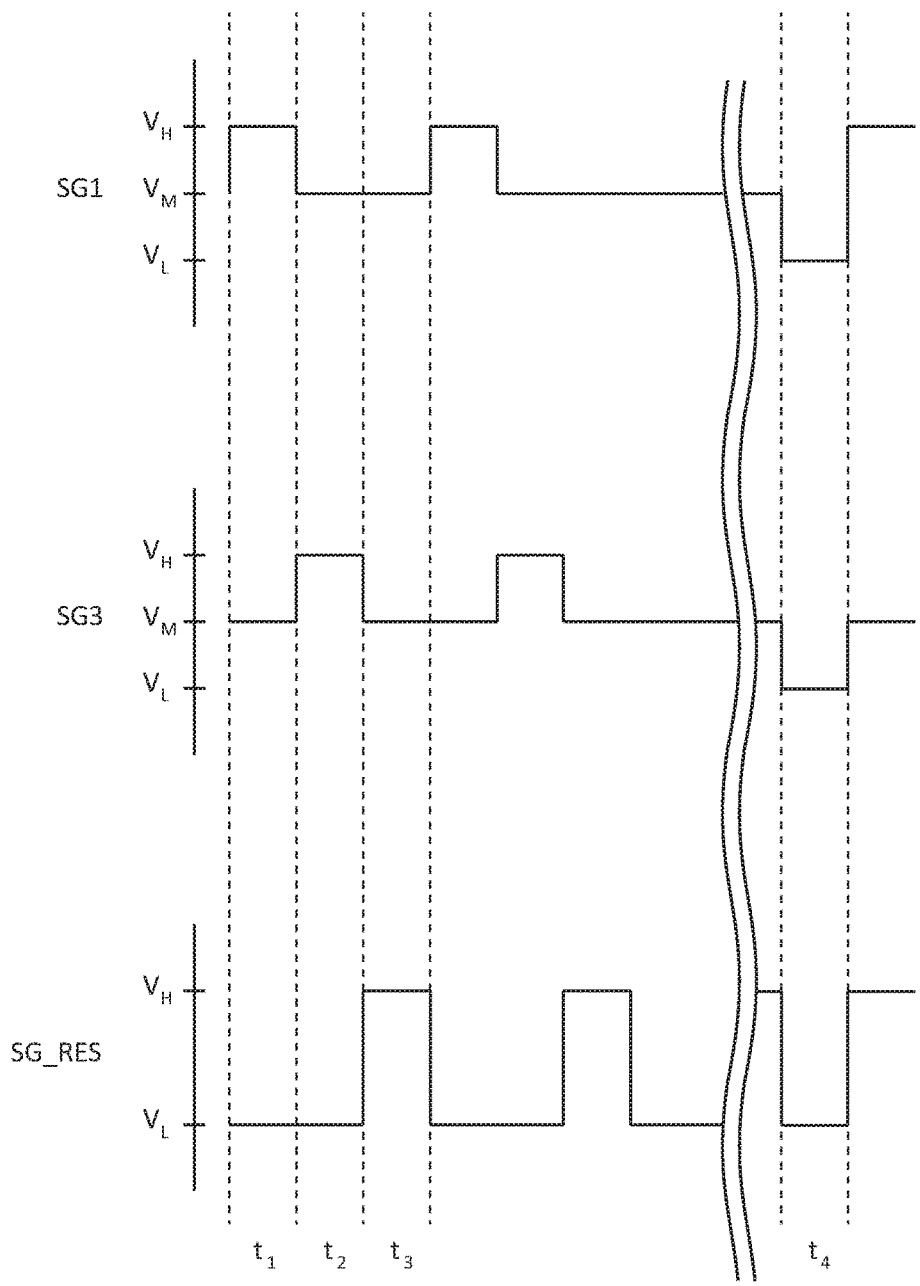
FIG. 6B is an illustrative timing diagram showing the timing of control signals for the charge steering structure of FIG. 6A in accordance with an embodiment.

Signals SG1, SG3, and SG_RES may behave according to the timing diagram shown in FIG. 6B. Time periods $t_1$, $t_2$, and $t_3$ may represent a single clock cycle of signals SG1, SG3, and SG_RES during the exposure period. At time period $t_1$, SG1 may be at high voltage level $V_H$, while SG3 is at medium voltage level $V_M$ and SG_RES is at low voltage level $V_L$ such that charge at node 649 is integrated at storage gate 636. At time period $t_2$, SG1 may be at medium voltage level $V_M$, while SG3 is at high voltage level $V_H$ and SG_RES is at low voltage level $V_L$ such that charge at node 649 is integrated at storage gate 632. At time period $t_3$, SG1 may be at medium voltage level $V_M$, while SG3 is at medium voltage level $V_M$ and SG_RES is at high voltage level $V_H$ such that charge at node 649 is disposed of at voltage supply 622. The clock cycle represented by time periods $t_1$, $t_2$, and $t_3$ may repeat throughout the exposure period. As shown in FIG. 6B, signals SG1, SG3, and SG_RES may each have the same duty cycle (e.g., a duty cycle of ~33.3%). If desired, the duty cycles of signals SG1, SG3, and SG_RES may be varied as long as the respective assertions of each signal at $V_H$ remain mutually exclusive. In some embodiments, there may be periods of time during the exposure period in which signal SG1 is held at $V_M$ and SG3 is held at $V_M$, and SG_RES is held at $V_L$. It should be noted that in some embodiments, instead of using the high voltage level $V_H$, a medium-high voltage level may be used having a magnitude between that of $V_H$ and $V_M$, such that some charge remains on the photodiode when charge is loaded onto storage gate 632 and storage gate 636.

Time period $t_3$ may occur at the end of the exposure period. At $t_3$, signals SG1, SG3, and SG_RES are held at $V_L$ while signals SG2, SG4, TX1, and TX3 are held at $V_H$ such that charge that has been integrated at storage gate 632 is passed through transfer transistor 634 and stored at storage gate 602, and charge that has been integrated at storage gate 636 is passed through transfer transistor 638 and stored at storage gate 640.

Figure 7A:
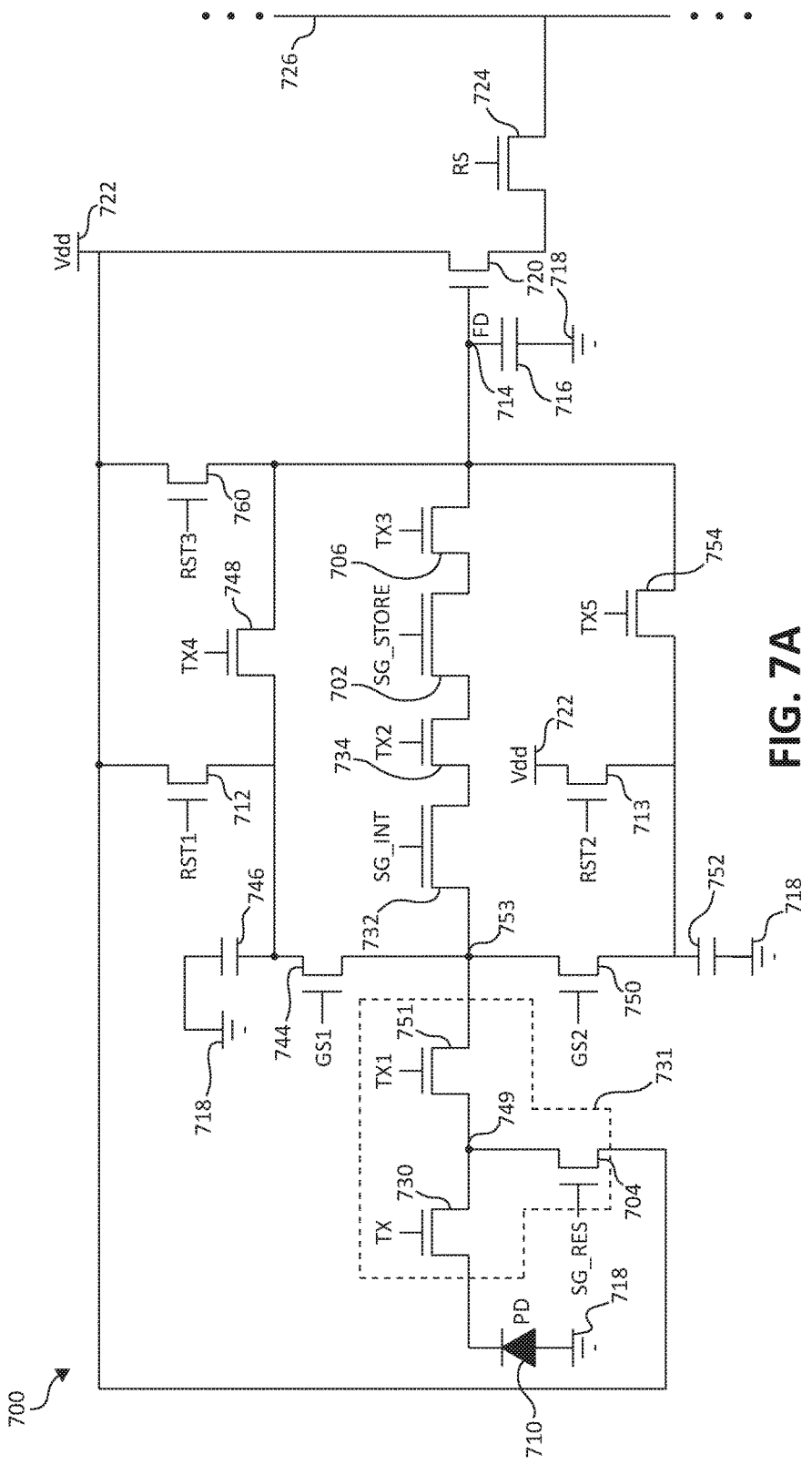
FIG. 7A is circuit diagram of an illustrative image sensor pixel that uses a global shutter method of readout, that includes a charge steering structure, and that includes dual gain storage capacitors in accordance with an embodiment.

FIG. 7A is a diagram of a pixel circuit 700 that includes a charge-steering coupled gate structure and that can be read out in a dual gain configuration. Coupled gate structure 731 may include storage gate reset transistor 704, threshold transistor 730, and transfer transistor 751. The coupled gate structure may work like a charge coupled device structure. Threshold transistor 730 may be coupled between photodiode (PD) 710 and node 749. Photodiode 710 may be coupled between threshold transistor 730 and ground 718. Storage gate reset transistor 704 may be coupled between node 749 and voltage supply 722. Voltage supply 722 may supply voltage $V_{dd}$. Transfer transistor 751 may be coupled between node 749 and node 753. Storage structure 732 (sometimes referred to herein as an integrating storage gate or as a storage gate) may be coupled between node 753 and transfer gate 734. In some embodiments, storage structure 732 may be a storage gate or a storage diode. For embodiments in storage structure 732 is a storage gate, an additional transistor may be optionally interposed between storage structure 732 and transfer transistor 751. For embodiments in which storage structure 732 is a storage diode, an additional transistor may be interposed between storage structure 732 and transfer transistor 751. Storage gate 732 may be a pinned storage node that is fully depletable (e.g., all charge may be removed from storage node 732 during charge transfer). Storage structure 702 (sometimes referred to herein as a storage gate) may be coupled between transfer gate 734 and transfer gate 706. In some embodiments, storage structure 702 may be a storage gate or a storage diode. Transfer gate 706 may be coupled to floating diffusion node 714.

Gain select transistor 744 may be coupled to node 753. Gain select capacitor 746 may be coupled between gain select transistor 744 and ground 718. Reset transistor 712 may be coupled between gain select transistor 744 and voltage supply 722. Transfer transistor 748 may be coupled between gain select capacitor 746 and floating diffusion node 714. Gain select transistor 750 may be coupled to node 753. Gain select capacitor 752 may be coupled between gain select transistor 750 and ground 718. Reset transistor 713 may be coupled between gain select transistor 750 and voltage supply 722. During reset operations, reset transistors 712 and 713 may be activated by asserting signals RST1 and RST2 respectively to reset gain select capacitors 746 and 752. Reset transistors 712 and 713 are optional. Reset transistor 760 may be coupled between voltage supply 722 and floating diffusion node 714. Reset transistor 760 may be used to reset floating diffusion node 714 and, if desired, storage gates 732 and 702. Transfer transistor 754 may be coupled between gain select capacitor 752 and floating diffusion node 714.

Floating diffusion capacitance 716 may be coupled between floating diffusion node 714 and ground 718. Source follower transistor 720 may have a gate terminal coupled to floating diffusion node 714, a first source-drain terminal coupled to voltage supply 722, and a second source-drain terminal coupled to column output line 726 through row select transistor 724. Column output line 726 may be coupled to downstream processing circuitry such as analog-to-digital conversion circuitry.

During an exposure period, impinging light (i.e., incident light) may be converted to electric charge in photodiode 710, which may have a limited charge storage capacity. In high light conditions, the charge storage capacity of photodiode 710 may not be sufficient to store all of the charge being generated in photodiode 710 and a portion of the generated charge may overflow. Threshold transistor 730 may receive a control signal TX that is set at a threshold voltage, which allows the overflow charge to pass to node 749 while the non-overflow charge remains on photodiode 710.

Storage gate 732 may receive control signal SG_INT. Storage gate reset transistor 704 may receive control signal SG_RES. Transfer transistor 751 may receive control signal TX1. Gain select transistor 744 may receive control signal GS1. Gain select transistor may receive control signal GS2. Storage gate 702 may receive control signal SG_STORE. Storage gates 732 and 702 may operate similarly to storage gate 432 described above in connection with FIG. 4A.

During the exposure period, signals TX1 and SG_RES may have mutually exclusive timings (e.g., TX1 is at high voltage $V_H$ when SG_RES is low and TX1 is at low voltage $V_L$ when SG_RES is high). By oscillating signals TX1 and SG_RES in this manner, overflow charge appearing on node 749 may be routed to voltage supply 722 when SG_RES is at a high voltage level and may be passed to node 753 when TX1 is at a high voltage level. SG_INT may be timed similarly to TX1 such that SG_INT is at high voltage level $V_H$ when TX1 is high in order to integrate overflow charge appearing at node 753 at storage gate 732. When pixel 700 is in dual gain configuration, gain select transistors 744 and 750 may be activated by asserting either signals GS1 or signal GS2 when TX1 is asserted so that a portion of the overflow charge stored at storage gate 732 may be stored on a selected one of gain select capacitors 746 and 752. The transfer of charge into one of gain select capacitors 746 and 752 may be triggered by setting a respective one of gain select transistors 744 and 750 at a threshold value (e.g., by adjusting the voltage level of signals GS1 and GS2), such that charge from storage gate 732 is transferred into one of gain select capacitors 746 and 752 only when the amount of charge stored at storage gate 732 is above a predetermined level. The amount of overflow charge that is disposed of at voltage supply 722 during exposure may be estimated and accounted for using downstream processing circuitry (not shown) based on the amount of overflow charge that is not disposed of (i.e., that ends up being read out from pixel 700) and based on the respective duty cycles of signals TX1 and SG_RES. At the end of the exposure period, floating diffusion node 714 may be reset by asserting signal RST3 to activate reset transistor 760.

Once the exposure period ends, all charge integrated in storage gate 732 may be transferred to storage gate 702 by setting SG_INT to low voltage level $V_L$, setting control signal TX2 to a high voltage level to activate transfer transistor 734, and setting control signal SG_STORE to high voltage level $V_H$ so that storage gate 702 can receive the transferred charge. Storage gate 702 may then pass the overflow charge to floating diffusion node 714 by asserting signal TX2 to activate transfer transistor 706 while signals SG_STORE and TX2 are held low in order to ensure that the charge flows into floating diffusion node 714. Non-overflow charge at photodiode 710 may then be passed to storage gate 702 through threshold transistor 730, transfer transistor 751, storage gate 732, and transfer transistor 734.

During readout operations, row select transistor 724 may be activated by asserting signal RS in order to read out a first output signal that corresponds to the overflow charge at floating diffusion node 714. Reset transistor 760 may then be activated by asserting signal RST3 in order to reset floating diffusion node 714. Row select transistor 724 may then be activated to read out a first reset signal that corresponds to the reset value at floating diffusion node 714. Signal TX4 may then be asserted to distribute charge between gain select capacitor 746 and floating diffusion node 714. Row select transistor 724 may then be asserted in order to read out a second output signal that corresponds to the voltage at floating diffusion node 714. Floating diffusion node 714 may then be reset a second time by activating reset transistor 760. During this second reset operation, transistor 748 may remain activated such that gain select capacitor 746 is also reset. Alternatively, transistor 748 may be deactivated during the second reset operation and gain select capacitor 746 may be reset at a later point by activating reset transistor 712 by asserting signal RST1. After the second reset operation has occurred, row select transistor 724 may be activated in order to read out a second reset signal that corresponds to the reset value at floating diffusion node 714. Storage gate 702 may then pass the non-overflow charges to floating diffusion node 714 by asserting signal TX3 to activate transfer transistor 706 while signals SG_STORE and TX2 are held low in order to ensure that the non-overflow charge flows into floating diffusion node 714. Row select transistor 724 may then be asserted in order to read out a third reset signal that corresponds to the reset value at floating diffusion node 714. If desired, the order in which the non-overflow charges and the charges at gain select capacitor 746 are read may be swapped (e.g., such that the non-overflow charges are read out before the charges stored at gain select capacitor 746). The readout operations described above are merely one example of a possible readout method/arrangement. Other methods of dual-gain readout may be used instead, if desired.

During the next exposure, integration, and readout period, gain select transistor 750, gain select capacitor 752, reset transistor 713, and transistor 754 (i.e., the second gain select path) should be used in place of gain select transistor 744, gain select capacitor 746, reset transistor 712, and transistor 748 (i.e., the first gain select path). The first and second gain select paths should be alternated between for each successive round of exposure, integration, and readout.

Figure 7B:
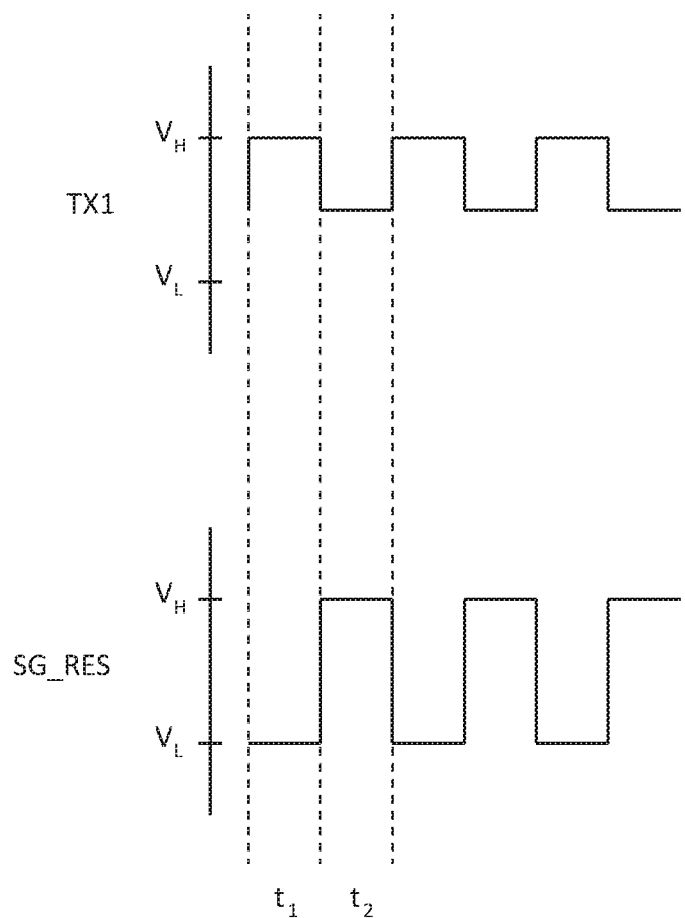
FIG. 7B is an illustrative timing diagram showing the timing of control signals for the charge steering structure of FIG. 7A in accordance with an embodiment.

Signals TX1 and SG_RES may behave according to the timing diagram shown in FIG. 7B. Time periods $t_1$ and $t_2$ may represent a single clock cycle of signals TX1 and SG_RES during the exposure period. At time period $t_1$, TX1 may be at high voltage level $V_H$, while SG_RES is at low voltage level $V_L$ such that overflow charge at node 749 is passed to node 753. At time period $t_2$, TX1 may be at low voltage level $V_L$, while SG_RES is at high voltage level $V_H$ such that overflow charge is disposed of at voltage supply 722. The clock cycle represented by time periods $t_1$ and $t_2$ may repeat throughout the exposure period. As shown in FIG. 7B, signals TX1 and SG_RES may each have a 50% duty cycle. If desired, other duty cycles may be selected. For example, signal TX1 may have a 25% duty cycle and signal SG_RES may have a 75% duty cycle if an increased dynamic range is desired. In some embodiments, there may be periods of time during the exposure period in which signal TX1 is held at $V_L$ and SG_RES is held at $V_L$.

Various embodiments have been described illustrating global shutter image sensors that have pixels with charge steering structures. Image sensors having pixels with charge steering structures may be used in an imaging system such as an electronic device.

An image sensor pixel may include a photodiode that generates charge in response to incident light during an exposure period, a coupled gate structure coupled to the photodiode, a storage structure coupled to the photodiode through the coupled gate structure, and a floating diffusion node coupled to the storage structure. Signals may be read out from the image sensor pixel in a global shutter mode The coupled gate structure may include a threshold transistor that is coupled to the photodiode and that is set to a threshold voltage such that a portion of the generated charge overflows past the threshold transistor as overflow charge, a reset transistor coupled to a voltage supply, and an integrating storage structure coupled between the threshold transistor and the first transfer transistor. The threshold transistor may be interposed between the photodiode and the reset transistor. A first portion of the overflow charge may be routed to and stored at the integrating storage structure. A second portion of the overflow charge may be routed to the voltage supply through the reset transistor. The reset transistor may receive a first control signal that oscillates between a high voltage and a low voltage during the exposure period. The integrating storage structure may receive a second control signal that oscillates between the high voltage and a medium voltage during the exposure period. The first control signal being at the high voltage may be mutually exclusive with the second control signal being at the high voltage. The coupled gate structure may further include an additional integrating storage structure coupled to the threshold transistor. The image sensor pixel may further include an additional storage structure coupled between the additional integrating storage structure and the floating diffusion node. The additional integrating storage structure may receive a third control signal that oscillates between the high voltage and the medium voltage. The third control signal being at the high voltage may be mutually exclusive with the first control signal being at the high voltage and with the second control signal being at the high voltage.

An image sensor may include an array of pixels arranged in rows and columns. Each pixel may include a photosensitive element that generates charge in response to impinging light, a charge steering structure coupled to the photosensitive element, a storage structure coupled to the photosensitive element through the charge steering structure, and a floating diffusion node coupled to the storage structure.

The charge steering structure may include a threshold transistor that is coupled to the photosensitive element and that is set to a threshold voltage such that a portion of the generated charge overflows past the threshold transistor as overflow charge, a reset transistor coupled to a voltage supply. The threshold transistor may be interposed between the photodiode and the reset transistor.

In one embodiment, each pixel may further include an additional storage structure coupled between the threshold transistor and the storage structure. A first portion of the overflow charge may be routed to and stored at the additional storage structure. A second portion of the overflow charge may be routed to the voltage supply through the reset transistor. The reset transistor may receive a first control signal that oscillates at a first frequency during the exposure period. The additional storage structure may receive a second control signal that oscillates at the first frequency during the exposure period. The first control signal may be 180 degrees out of phase with the second control signal during the exposure period.

In one embodiment, each pixel may further include a gain select capacitor coupled to the floating diffusion node and a gain select transistor coupled between the gain select capacitor and the additional storage structure, an additional gain select capacitor coupled to the floating diffusion node, and an additional gain select transistor coupled between the additional gain select capacitor and the additional storage structure. A first portion of the overflow charge may be routed to and stored at the additional storage structure and a selected one of the gain select capacitor and the additional gain select capacitor via activation of the additional storage structure. A second portion of the overflow charge may be routed to the voltage supply through the reset transistor via activation of the reset transistor. The activation of the reset transistor and the activation of the additional storage structure may be mutually exclusive.

An imaging system may include an image sensor having an array of pixels arranged in rows and columns. Each pixel in the array of pixels may include a photodiode that generates charge in response to incident light, a short integration storage structure coupled to the photodiode, a long integration storage structure coupled to the photodiode, a floating diffusion node coupled to the short integration storage structure, and a charge storage structure coupled between the long integration structure and the floating diffusion node. A first portion of the charge may be routed to and stored at the short integration storage structure. A second portion of the charge may be routed to and stored at the long integration storage structure. The short integration storage structure may receive a first control signal that oscillates between a high voltage and a medium voltage during the exposure period. The long integration storage structure may receive a second control signal that oscillates between the high voltage and the medium voltage during the exposure period. The first control signal being at the high voltage is may be exclusive with the second control signal being at the high voltage. Each pixel in the pixel array may further include a voltage supply and an anti-blooming transistor coupled between the photodiode and the voltage supply.

The foregoing is merely illustrative of the principles of this invention, which can be practiced in other embodiments.

What is claimed is:

1. An image sensor pixel comprising:
a photodiode that generates charge in response to incident light during an exposure period;
a threshold transistor that is coupled to the photodiode and that is set to a threshold voltage, wherein a portion of the generated charge overflows past the threshold transistor as overflow charge;
a reset transistor coupled to a voltage supply, wherein the threshold transistor is interposed between the photodiode and the reset transistor;
a first storage structure coupled to the threshold transistor;
a second storage structure coupled to the photodiode through the first storage structure; and
a floating diffusion node coupled to the second storage structure.

2. The image sensor pixel defined in claim 1, wherein a first portion of the overflow charge is routed to and stored at the first storage structure, and wherein a second portion of the overflow charge is routed to the voltage supply through the reset transistor.

3. The image sensor pixel defined in claim 2, wherein the reset transistor receives a first control signal that oscillates between a high voltage and a low voltage during the exposure period, wherein the first storage structure receives a second control signal that oscillates between the high voltage and a medium voltage during the exposure period, and wherein the first control signal being at the high voltage is mutually exclusive with the second control signal being at the high voltage.

4. The image sensor pixel defined in claim 3, further comprising:
a third storage structure coupled to the threshold transistor; and a fourth storage structure coupled between the third storage structure and the floating diffusion node.

5. The image sensor pixel defined in claim 4, wherein the third storage structure receives a third control signal that oscillates between the high voltage and the medium voltage, and wherein the third control signal being at the high voltage is mutually exclusive with the first control signal being at the high voltage and with the second control signal being at the high voltage.

6. The image sensor pixel defined in claim 1, wherein signals are read out from the image sensor pixel in a global shutter mode.

7. An image sensor comprising:
an array of pixels arranged in rows and columns, wherein each pixel comprises:
a photosensitive element that generates charge in response to impinging light;
a charge steering structure coupled to the photosensitive element, wherein the charge steering structure comprises a threshold transistor that is coupled to the photosensitive element and that is set to a threshold voltage and wherein a portion of the generated charge overflows past the threshold transistor as overflow charge;
a storage structure coupled to the photosensitive element through the charge steering structure; and
a floating diffusion node coupled to the storage structure.

8. The image sensor defined in claim 7, wherein the charge steering structure comprises:
a reset transistor coupled to a voltage supply, wherein the threshold transistor is interposed between the photodiode and the reset transistor.

9. The image sensor defined in claim 8, wherein each pixel further comprises:
an additional storage structure coupled between the threshold transistor and the storage structure, wherein a first portion of the overflow charge is routed to and stored at the additional storage structure, and wherein a second portion of the overflow charge is routed to the voltage supply through the reset transistor.

10. The image sensor defined in claim 9, wherein the reset transistor receives a first control signal that oscillates at a first frequency during the exposure period, wherein the additional storage structure receives a second control signal that oscillates at the first frequency during the exposure period, and wherein the first control signal is 180 degrees out of phase with the second control signal during the exposure period.

11. The image sensor defined in claim 9, wherein each pixel further comprises:
a gain select capacitor coupled to the floating diffusion node; and
a gain select transistor coupled between the gain select capacitor and the additional storage structure.

12. The image sensor defined in claim 11, wherein each pixel further comprises:
an additional gain select capacitor coupled to the floating diffusion node; and
an additional gain select transistor coupled between the additional gain select capacitor and the additional storage structure.

13. The image sensor defined in claim 12, wherein a first portion of the overflow charge is routed to and stored at the additional storage structure and at a selected one of the gain select capacitor and the additional gain select capacitor via activation of the additional storage structure, and wherein a second portion of the overflow charge is routed to the voltage supply through the reset transistor via activation of the reset transistor.

14. The image sensor defined in claim 13, wherein the activation of the reset transistor and activation of the additional storage structure are mutually exclusive.

15. An imaging system comprising:
an image sensor having an array of pixels arranged in rows and columns, wherein each pixel in the array of pixels comprises:
a photodiode that generates charge in response to incident light;
a first charge storage structure coupled to the photodiode, wherein the first charge storage structure comprises one of a storage gate and a storage diode;
a second charge storage structure coupled to the photodiode, wherein the second charge storage structure comprises one of a storage gate and a storage diode;
a floating diffusion node coupled to the first charge storage structure; and
a third charge storage structure coupled between the second charge storage structure and the floating diffusion node.

16. The imaging system defined in claim 15, wherein a first portion of the charge is routed to and stored at the first charge storage structure, and wherein a second portion of the charge is routed to and stored at the second charge storage structure.

17. The imaging system defined in claim 16, wherein the first charge storage structure receives a first control signal that oscillates between a high voltage and a medium voltage during the exposure period, wherein the second charge storage structure receives a second control signal that oscillates between the high voltage and the medium voltage during the exposure period, and wherein the first control signal being at the high voltage is mutually exclusive with the second control signal being at the high voltage.

18. The imaging system defined in claim 15, wherein each pixel in the array of pixels further comprises:
a voltage supply; and
an anti-blooming transistor coupled between the photodiode and the voltage supply.

19. The imaging system defined in claim 15, wherein each pixel in the array of pixels further comprises:
a first transfer transistor interposed between the first charge storage structure and the floating diffusion node;
a second transfer transistor interposed between the second charge storage structure and the third charge storage structure; and
a third transfer transistor interposed between the third charge storage structure and the floating diffusion node.

20. The image sensor defined in claim 7, wherein the portion of the generated charge that overflows past the threshold transistor is a first portion of the generated charge and wherein a second portion of the generated charge remains on the photosensitive element.

* * * * *